United States Patent
Vure et al.

(10) Patent No.: US 8,832,563 B2
(45) Date of Patent: Sep. 9, 2014

(54) AUTOMATIC DETECTION OF DESIGNATED CONTROLLER IN A DISTRIBUTED CONTROL SYSTEM USING A WEB CLIENT

(75) Inventors: Suresh Vure, Hyderabad (IN); Mark R. Phelps, Roanoke, VA (US); Rohan Saraswat, Hyderabad (IN); Raja Balasubramaniam, Bangalore (IN)

(73) Assignee: General Electric Company, Schenectady, NY (US)

( * ) Notice: Subject to any disclaimer, the term of this patent is extended or adjusted under 35 U.S.C. 154(b) by 421 days.

(21) Appl. No.: 13/192,413

(22) Filed: Jul. 27, 2011

(65) Prior Publication Data
US 2013/0031483 A1 Jan. 31, 2013

(51) Int. Cl.
G05B 19/04 (2006.01)

(52) U.S. Cl.
USPC ............................................. 715/744; 700/83

(58) Field of Classification Search
None
See application file for complete search history.

(56) References Cited

U.S. PATENT DOCUMENTS

| | | | |
|---|---|---|---|
| 5,584,171 A | 12/1996 | Sato et al. | |
| 5,973,696 A | 10/1999 | Agranat et al. | |
| 6,456,308 B1 | 9/2002 | Agranat et al. | |
| 6,985,779 B2 | 1/2006 | Hsiung et al. | |
| 7,010,396 B2 | 3/2006 | Ware et al. | |
| 7,100,427 B2 | 9/2006 | Kahn et al. | |
| 7,104,115 B2 | 9/2006 | Kahn et al. | |
| 7,249,000 B2 | 7/2007 | Kahn et al. | |
| 7,424,399 B2 | 9/2008 | Kahn et al. | |
| 2008/0040477 A1* | 2/2008 | Johnson et al. | 709/224 |
| 2011/0087636 A1* | 4/2011 | Michailov et al. | 707/655 |
| 2012/0020786 A1* | 1/2012 | Ayres | 416/1 |

FOREIGN PATENT DOCUMENTS

| | | |
|---|---|---|
| EP | 0298895 A2 | 1/1989 |
| EP | 0298895 B1 | 12/1991 |
| EP | 0615060 A1 | 9/1994 |
| EP | 1816327 A2 | 8/2007 |
| EP | 1816327 A3 | 7/2008 |
| KR | 0161315 B1 | 1/1999 |
| KR | 20030043382 A | 6/2003 |
| WO | 2009046095 A1 | 4/2009 |

* cited by examiner

Primary Examiner — Matt Kim
Assistant Examiner — William Trapanese
(74) Attorney, Agent, or Firm — Fletcher Yoder, P.C.

(57) ABSTRACT

A control system, in one embodiment, includes a plurality of controllers. Each of the plurality of controllers is configured to provide process data to a human-machine interface (HMI) client when selected as a designated controller. A first controller of the plurality of controllers is a current designated controller and is configured to communicate with the HMI client. The control system also includes designated controller selection logic configured to detect an interruption in communication between the current designated controller and the HMI client, poll each of the plurality of controllers for a response, determine which of the plurality of controllers responds first, and select the controller that responds first as the next designated controller.

20 Claims, 8 Drawing Sheets

AUTOMATIC DETECTION OF DESIGNATED CONTROLLER IN A DISTRIBUTED CONTROL SYSTEM USING A WEB CLIENT

BACKGROUND OF THE INVENTION

The subject matter disclosed herein relates generally to control systems and, more particularly, to distributed control systems.

Control systems are often used in conjunction with process systems, such as manufacturing or production processes, to regulate and/or monitor various operating parameters of the process. For instance, a control system may regulate the values of certain input parameters of the process in order to drive one or more target output parameters (e.g., flow rate, power output, etc.) to a desired value. Some control systems may also provide process data to an operator in the form of visual feedback, such as by outputting certain selected data points through a human-machine interface (HMI), which may include a graphical user interface displayed using a display device. This may enable the operator to monitor and assess the process performance parameters in substantially real time and, if necessary, take corrective actions if certain parameters are deviating from an expected range or norm.

Certain control systems may be implemented using a distributed control system (DCS) architecture. In a DCS, the control elements may be distributed at various locations throughout the process instead of being arranged at a centralized location. For instance, various control components, such as sensors, actuators, sub-controllers, and so forth, may be distributed throughout the process, but may be networked communication with a main controller of the DCS. In certain DCSs, multiple controllers may be provided for redundancy and safety issues, with only one controller being a designated controller at any given time. For instance, if a current designated controller malfunctions or goes offline, another controller may be selected as the designated controller. In such systems, the designated controller may function as a server providing process data to the HMI, acting as a client. However, some HMI clients that are based on redundant controllers may not be able to detect a change in a designated controller and connect to that designated controller. Thus, an operator may have to manually re-establish a connection between the HMI client and the designated controller, which may be time consuming and inconvenient. Additionally, requiring an operator to manually identify changes in a designated controller and manually reconnect an HMI to the designated controller may result in loss of data or information, which may present potential safety issues.

BRIEF DESCRIPTION OF THE INVENTION

In one embodiment, a control system includes a plurality of controllers. Each of the plurality of controllers is configured to provide process data to a human-machine interface (HMI) client when selected as a designated controller. A first controller of the plurality of controllers is a current designated controller and is configured to communicate with the HMI client. The control system also includes designated controller selection logic configured to detect an interruption in communication between the current designated controller and the HMI client, poll each of the plurality of controllers for a response, determine which of the plurality of controllers responds first, and select the controller that responds first as the next designated controller.

In another embodiment, a system includes a process. The system also includes a client device comprising a web-based human-machine interface (HMI). Additionally, the system includes a distributed control system in networked communication with the client device and the process, wherein the distributed control system is configured to control the process. The distributed control system includes a plurality of controllers, each of which are configured to provide data from the process to the web-based HMI of the client device when acting as a designated controller. Additionally, the distributed control system includes designated controller selection logic configured to detect an interruption in communication between a previous designated controller and the web-based client, poll each of the plurality of controllers for a response, and select a current designated controller as the controller that responds first to the polling. The client device is configured to automatically establish communication with the current designated controller to obtain data from the process.

In a further embodiment, a tangible computer-readable medium having instructions encoded thereon is provided. The instructions include machine-readable code for determining whether communication between a designated controller and a web-based client is interrupted, wherein the designated controller was previously selected from plurality of controllers of a redundant control system. The instructions further include machine-readable code to poll each of the plurality of controllers for a response. The instructions further include machine-readable code to identify which of the plurality of controllers responds first to the polling. Finally, the instructions include machine-readable code to select the controller that responded first as a new designated controller.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed further below, certain embodiments provide techniques for implementing a redundant control system for controlling a process. For instance, the control system may include multiple controllers configured in a redundant manner. Initially a designated controller may provide process data to a web client. If communication to the designated controller is interrupted, a detection module may be implemented to identify the next designated controller. For instance, in one embodiment, the module is configured to poll all controllers for a response upon detecting the designated controller going offline. The first controller to provide a response is established as the new designated controller. The module then indicates the new designated controller to the web client, which establishes a connection with the new designated controller to continue receiving process data. In this manner, a web client may automatically detect and connect with a designated controller without the need for manually reestablishing a connection when a designated controller goes offline.

Figure 1:
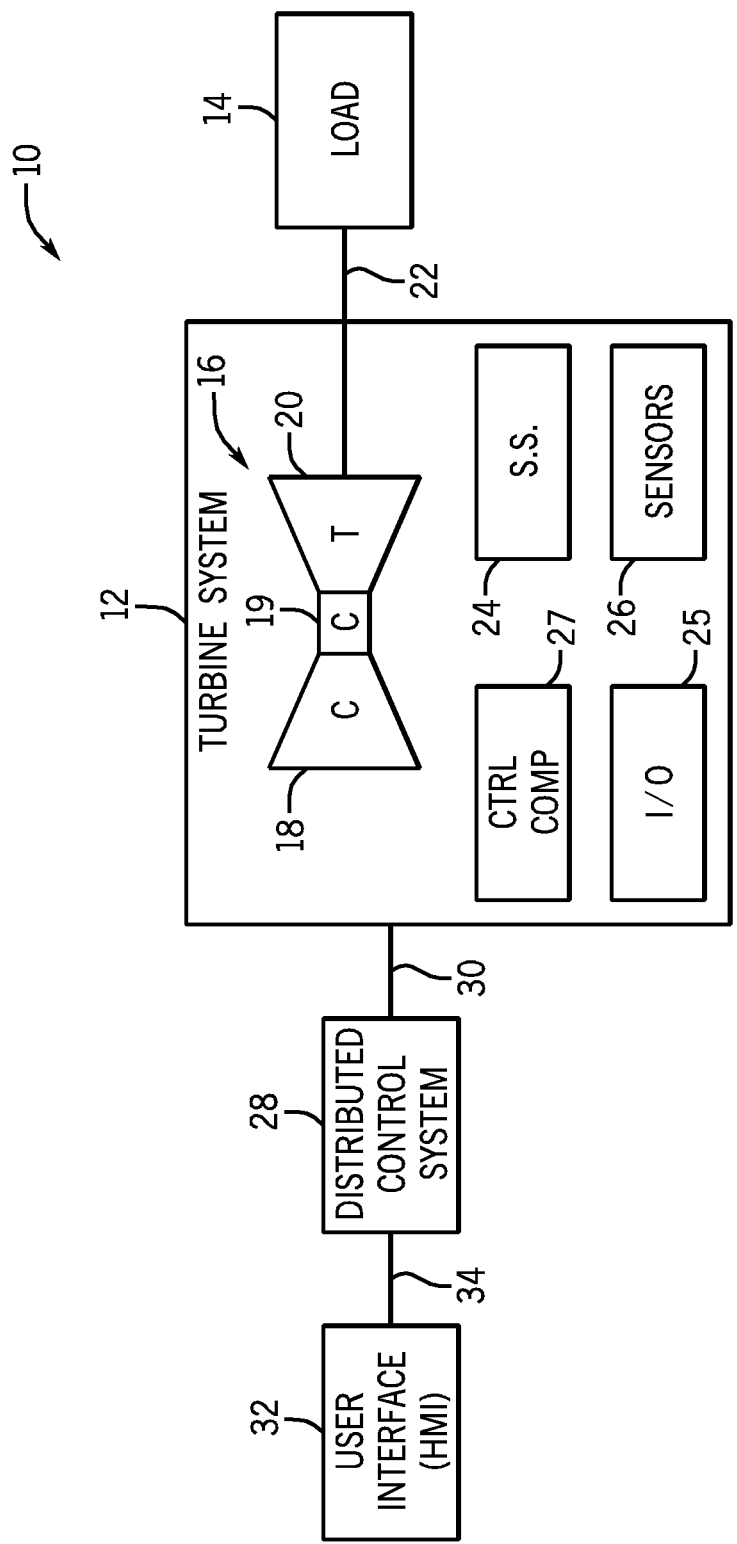
FIG. 1 is a block diagram depicting a process system having a control system, in accordance with an embodiment of the present invention.

With the foregoing points in mind FIG. 1 depicts an embodiment of a process system 10 that includes a turbine system 12 and a load 14. The turbine system 12 utilizes a gas turbine 16 to drive the load 14, which may be any suitable device that is configured to generate power via the rotational output of the turbine system 12, such as an external mechanical load or a power generation plant. By way of example only, in some embodiments, the load 14 may include an electrical generator, a propeller of an airplane, and so forth. Before continuing, it should be understood that the process systems 10 of FIG. 1 is illustrated as having a turbine system 12 by way of example only. Indeed, the presently disclosed techniques may be applicable to any other type of process system 10. For example, in other embodiments, the process system 10 may include a manufacturing system, a batch process system, a temperature control system, a blowout prevention system, or plant control (e.g., balance of plant) system, such as boiler control, water treatment, and so forth. By way of example only, in an embodiment where the process system 10 includes a blowout prevention system, reference number 12 may refer to a blowout prevention device.

The turbine system 12 may use liquid or gas fuel, such as natural gas and/or a hydrogen rich synthetic gas, to run the turbine system 12. In self-sustaining operation, air may be received and pressurized by a compressor 18 prior to being supplied to fuel nozzles (not shown) of the gas turbine 16. The fuel nozzles may intake a fuel supply, mix the fuel with received air, and distribute the air-fuel mixture into a combustor 19. The combustion of the air-fuel mixture may create hot pressurized gases within the combustor 19, which are then directed through a turbine section 20, which may include turbine blades disposed about a shaft 22 extending along a rotational axis of the gas turbine 16. As the exhaust gases pass through the turbine section 20, the gases may force the turbine blades to rotate the shaft 22, thus driving the load 14 into rotation.

The turbine system 12 shown in FIG. 1 also includes a static starter subsystem 24, which may be utilized during a starting sequence of the turbine system 12 (e.g., when the gas turbine 16 is initially started up from a generally stationary position). For instance, during a starting sequence, the static starter subsystem 24, which may include a generator, may function as a variable speed AC drive system that drives the generator as a synchronous motor to accelerate the gas turbine 16 in accordance with a desired speed profile that provides desired starting conditions for the turbine 16. For instance, in one embodiment, a desired starting condition may be one in which the turbine 16 reaches a speed such that it is capable of self-sustaining operation independent from the static starter subsystem 24 via its own combustion processes. Once a desired speed is achieved, the static starter subsystem 24 may disengage from the generator while the gas turbine 16 continues to operate independently of the static starter subsystem 24.

As shown in FIG. 1, the turbine system 12 also includes sensors 26 and control components 27, which may be part of a distributed control system (DCS) 28. That is, although shown as being separate from the DCS 28 in FIG. 1, the sensors 26 and control components 27, which may include I/O modules, actuators, sub-controllers, logic controllers, field devices, network components, and so forth, may be communicatively coupled to one or more controllers of the DCS 28 via the network 30, which may include local area networking (e.g., LAN, Ethernet), wireless networking (e.g., based on 802.11 standards), or industrial control networking protocols, such as a fieldbus networking protocol (e.g., IEC 61158). Thus, the control system 28 is distributed in the sense that not all of its components are necessary arranged at a central location. For instance, field devices and controllers may be located remotely from each other, and the I/O modules may be configured to filter and/or condition signals exchanged between a controller and the field devices. In the illustrated embodiment, the I/O modules are represented by the reference number 25. The controllers of the DCS 28 may implement the control algorithm that controls the system 10 to achieve a desired result or output (e.g., a power output). As discussed in further detail below, the DCS 28 may include multiple controllers configured to operate in a redundant manner.

The system 10 may also include one or more human-machine interfaces (HMI) 32, which may be communicatively coupled to the control system 28. For instance, the HMI 32 may be implemented on a computing device having a display (e.g., LCD display) configured to provide the HMI 32 in the form of a graphical user interface (GUI). As discussed in more detail below, in one embodiment, the HMI 32 may include a client-side web application that fetches data from the active or designated controller of the DCS 28, which acts as a server. Thus, data from the process being carried out by the system 10 may be served from a designated controller of the DCS 28 to the HMI 32. In this manner, an operator may observe and monitor the performance of the system 10 via the HMI 32 and, in some embodiments, may also provide inputs through the HMI 32 to manually adjust one or more parameters of the system 10. In one embodiment, the HMI 32 may be implemented as a web-based interface that may utilize JAVA, XML (Extensible Markup Language), CSS (Cascading Style Sheets), AJAX (Asynchronous JavaScript and XML), DHTML (Dynamic Hypertext Markup Language), and so forth, or any combination of such technologies. In one embodiment, the HMI 32 may be a web-based HMI that utilizes a web framework based on AJAX and DHTML that uses an embedded web server implemented on the controllers of the DCS 28.

As shown, the HMI 32 may be communicatively coupled to the DCS 28 by the network 34. The network 34 may include any suitable networking protocol, such as local area networking (LAN) and/or wireless networking (e.g., 802.11 standards). Further, the HMI 32 may be physically located in relatively close proximity to the system 10 (e.g., visual proximity), or may be located remotely. The HMI 32 may be provided on any suitable computing device, including a desktop computer, a workstation computer, a notebook computer, a tablet computer, a personal digital assistant (PDA), a mobile telephone, and so forth.

Figure 2:
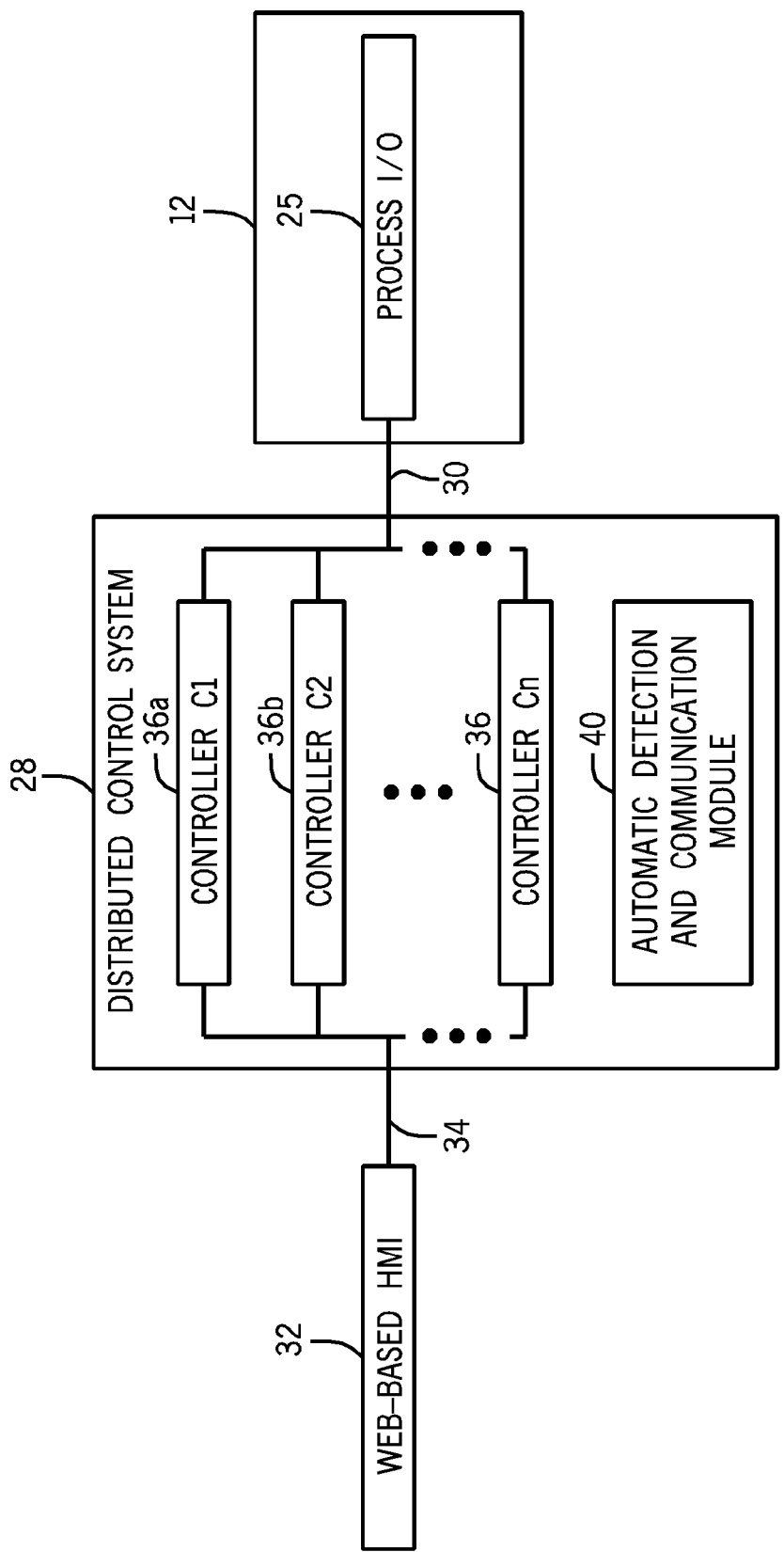
FIG. 2 is a block diagram illustrating the control system of FIG. 1 as including multiple controllers and an automatic detection and communication module, in accordance with an embodiment of the present invention.

Referring to FIG. 2, the DCS 28 of FIG. 1 is illustrated in further detail. As shown, the DCS 28 may include multiple controllers 36 configured to operate in a redundant manner. For instance, at any given time, one of the controllers 36 is selected as a designated controller. Data served to the HMI client 32, which may be a web-based client implementing a web-based interface, is provided by the designated controller. As discussed above, in some conventional control systems, even when multiple controllers are provided for redundancy purposes, an HMI client may be unable to automatically, detect a change in designated controller status, and an operator may have to manually reestablish a connection between the HMI and a new designated controller in order to continue receiving data. In the illustrated DCS 28 of FIG. 2, an automatic detection and communication module 40 is provided. The module 40, which may also be referred to as a designated controller selection module or logic, is configured to, upon detecting a designated controller going offline, polls all controllers for a response. The first controller that provides a response is established as the new designated controller. It should be noted that the new designated controller may, in some cases, be the same controller as the previous designated controller. The module 40 then indicates to the web-based HMI 32 the new designated controller, and the HMI 32 automatically establishes a connection with the new designated controller to continue receiving data. Further, while shown in FIG. 2 as being separate from each of the controllers 36, the logic implemented by the automatic detection and communication module 40 may actually be distributed across all controllers 36 of the DCS 28.

As shown, each of the controllers 36 may be communicatively coupled to process I/O module(s) 25 of the turbine system 12 by the network 30, and may communicate with the sensors 26 and control components 27. Further, each of the controllers 36 is communicatively coupled to the web-based HMI 32 by the network 34. Thus, each of the controllers 36 receives process data from the system 10, and is capable of serving the data to the HMI 32 if selected as a designated controller. While the network 30 is symbolically depicted as a single path between the controllers 36 and the turbine system 12 (e.g., the sensors 26 and control components 27), the network 30 may represent separate respective network paths between each controller 36 and the turbine system 12. For instance, a first path may exist between the controller 36a and the turbine system 12, a second path may exist between the controller 36b and the turbine system 12, and so forth.

Figure 3:
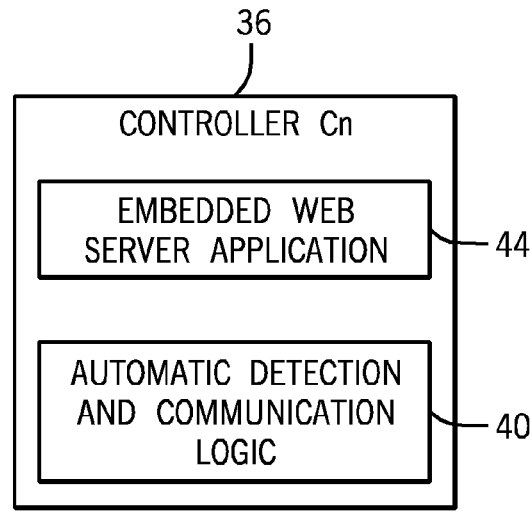
FIG. 3 shows illustrates a more detailed view of one of the controllers of the control system shown in FIG. 2.

FIG. 3 shows one of the controllers 36 of the DCS 28 of FIG. 2 in accordance with one embodiment. As discussed above, the automatic detection and communication module 40 may be distributed across all controllers and/or the HMI client(s) 32. Thus, as shown in FIG. 3, a portion of the logic implemented by the module 40 may be provided as part of the controller 36. The controller 36 additionally includes an embedded web server application 44, which is sometimes referred to as a "tiny" web server. The web server 44 may be based on any suitable real-time operating system. For example, in one embodiment, the embedded web server 44 may be a micro-kernel operating system, such as the QNX operating system, available from QNX Software Systems Ltd., a subsidiary of Research in Motion Ltd., of Waterloo, Ontario, Canada. By way of example only, the embedded web server application 44 may be based on the QNX Slinger web server software. The web server 44 may provide an HTTP server for embedded environments and may provide support for DHTML and SSI (Server Side Includes) functions.

As can be appreciated, all controllers 36 of the DCS 28 may be implemented in a similar manner. When the controller 36 shown in FIG. 3 is the designated controller, the data from the system 10 may be served to the web-based HMI client 32 in the form of dynamic webpages. Further, though not shown in FIG. 3, the controller may include various suitable hardware components, such as a processor configured to execute a control algorithm, as well as memory configured to store programs, such as the module 40 and the web server 44.

Figure 4:
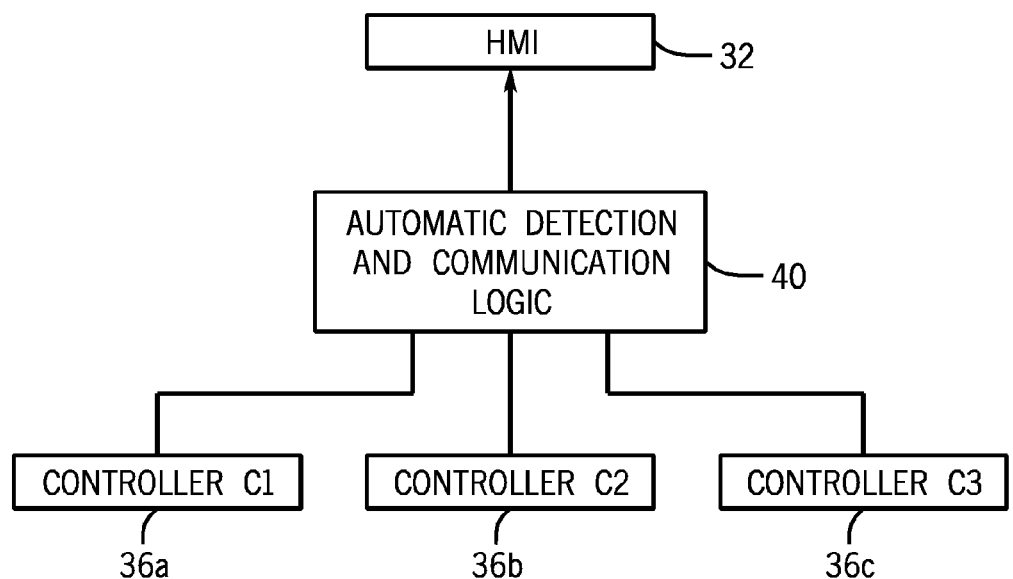
FIG. 4 is a diagrammatical representation illustrating how the automatic detection and communication module may be communicatively arranged with respect to an HMI client and first, second, and third controllers of the control system of FIG. 2.

Referring to FIG. 4, an embodiment of the DCS 28 that includes three controllers C1 (36a), C2 (36b), and C3 (36c) is shown, with the three controllers C1-C3 being configured to implement a triple modular redundancy mode of operation. While three controllers are mentioned here, it should be understood that the term redundancy may refer to a system having at least 2 controllers (e.g., 2 to n, wherein n is any number of additional controllers). To generally describe the operation of the controllers C1-C3, the web-based HMI client 32 may first establish communication with the web server 44 of the designated controller, which is assumed, by way of example only, to initially be controller C1. Initially, the web-based HMI client 32 may establish communication with web server 44 of controller C1 using an internet protocol (IP) address corresponding controller C1's communication port. In one embodiment, the web framework implemented by the HMI client 32 may allow for real-time data from the process implemented by the system 10 to be served from the controller C1 to the HMI client 32. By way of example only, in one embodiment, the HMI client 32 may utilize JavaScript or VBScript enabled software modules to communicate with the web server 44 of controller C1 to obtain real-time data using AJAX technologies. The fetched data may be updated in the web-based HMI 32 periodically based on a configurable refresh rate. By way of example only, the refresh rate may be between approximately 1-15 seconds.

The automatic detection and communication module 40 may be configured to detect the status of each controller 36 of the DCS 28 in order to determine which controller 36 is presently the designated controller. For instance, in the context of startup process described above, the module 40 may identify controller C1 as being the designated controller, and information identifying controller C1 as the designated controller, such as a device name, IP address, or a combination thereof, is provided to the HMI 32. As discussed in more detail below, when the designated controller (e.g., C1) goes offline for any reason (e.g., due to malfunction, power loss, network line issues, etc.), the automatic detection and communication module 40 is configured to implement a process for selecting the next designated controller (e.g., C2) and providing this information to the HMI client 32. Thus, the HMI client 32 may automatically switch over to communicate with the next designated controller. Further, while only three controllers C1-C3 are shown in FIG. 4, it should be understood that other embodiments may include any desired number of controllers.

With the foregoing points in mind, the logic implemented by the automatic detection and communication module 40 is shown in further detail below in FIGS. 5-7. As described above, the logic implemented by the module 40 may be distributed across all of the controllers, in this example, controllers C1-C3. Accordingly, the logic 46 illustrated in FIG. 5 may represent the portion of the module 40 that is implemented in controller C1, the logic 48 illustrated in FIG. 6 may represent the portion of the module that is implemented in controller C2, and the logic 50 illustrated in FIG. 7 may represent the portion of the module that is implemented in controller C3.

Figure 5:
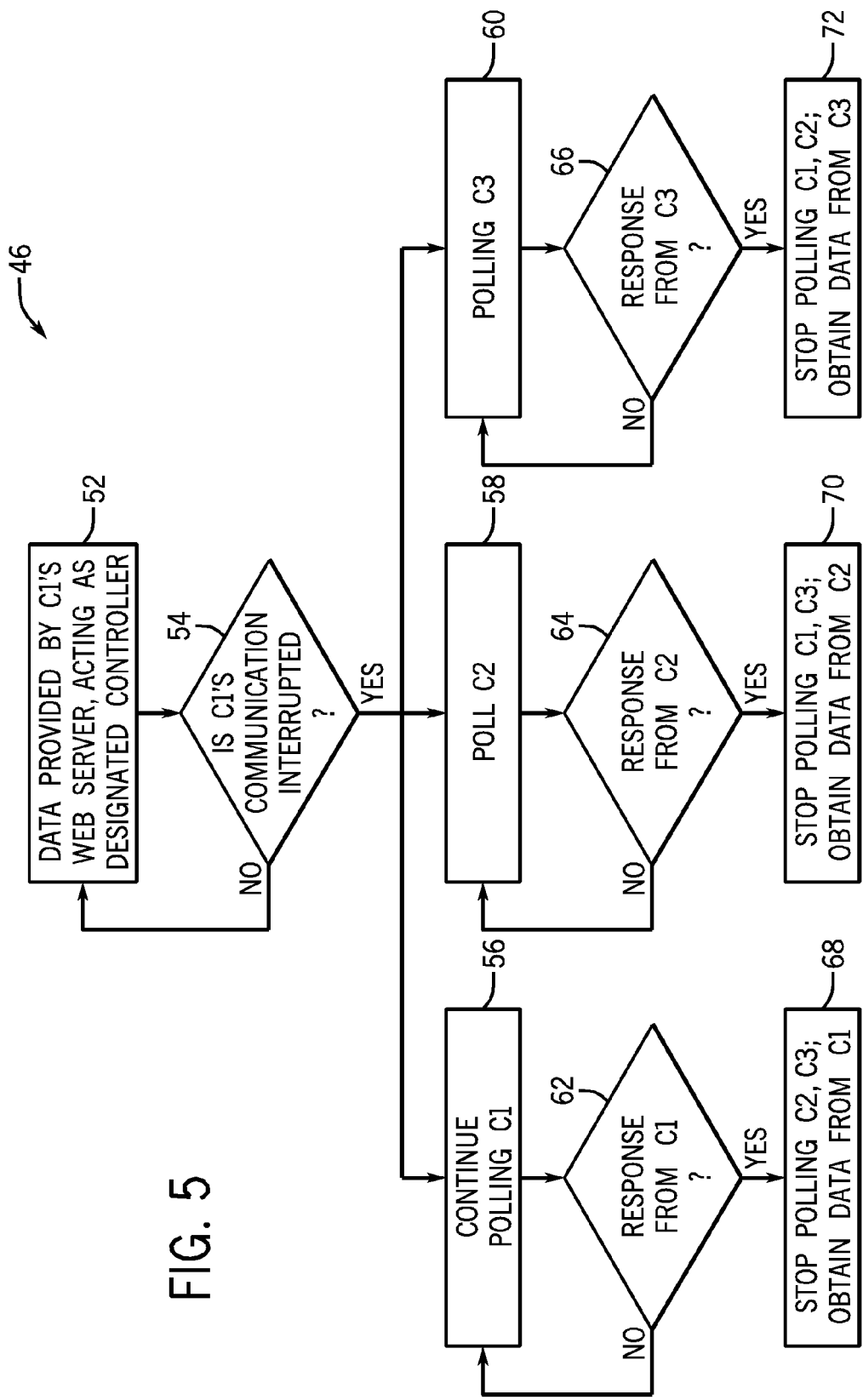
FIG. 5 is a flow chart depicting a process that may be implemented on the first controller of FIG. 4 by the automatic detection and communication module, in accordance with an embodiment of the present invention.

Referring to FIG. 5, the logic 46, which represents the portion of the module 40 implemented in controller C1, begins at step 52. At step 52, controller C1 (36a) is initially the designated controller and provides data to the HMI client 32. Decision logic 54 determines whether controller C1's communication path (e.g., path to the HMI client 32 and/or to the turbine system 12) is interrupted. For instance, controller C1's communication path may be interrupted by a number of reasons, such as component or controller malfunction, networking errors, power loss, etc. If no interruption is detected, the logic 46 returns to step 52, and controller C1 remains as the designated controller.

If an interruption is detected, the logic 46 continues from decision logic 54 to each of steps 56, 58, and 60 in which the controllers C1, C2, and C3, respectively, are polled, and their subsequent steps (e.g., steps 62, 64, 66) may occur in parallel. For instance, the polling steps may include pinging each of the controllers C1-C3 and awaiting a response. From step 56, a determination is made at decision logic 62 as to whether a response is received from controller C1. If no response is obtained from controller C1, logic 46 returns from decision logic 62 to step 56 and continues polling C1. Concurrently, from step 58, a determination is made at decision logic 64 as to whether a response is received from controller C2. If no response is obtained from controller C2, logic 46 returns from decision logic 64 to step 58 and continues polling C2. Also concurrently, from step 60, a determination is made at decision logic 66 as to whether a response is received from controller C3. If no response is obtained from controller C3, logic 46 returns from decision logic 64 to step 66 and continues polling C3. Depending on which of the controllers C1-C3 responds first to the polling from steps 56-60, one of steps 68, 70, or 72 is performed. For instance, if controller C1 responds first, decision logic 62 proceeds to step 68 at which the logic 46 stops polling controllers C2 and C3 and sets controller C1 as the designated controller again. In this case, the new designated controller is the same as the previous designated controller, and the web-based HMI 32 continues communicating with and obtaining data from controller C1.

If controller C2 responds first, decision logic 64 proceeds to step 70 at which the logic 46 stops polling controllers C1 and C3 and sets controller C2 as the designated controller. In this case, the web-based HMI 32 switches its communication path to communicate with and obtain data from controller C2. If controller C3 responds first, then decision logic 66 proceeds to step 72 at which the logic 46 stops polling controllers C2 and C1 and sets controller C3 as the designated controller. In this case, the web-based HMI 32 switches its communication path to communicate with and obtain data from controller C3. As will be appreciated, the logic 46, 48, and 50 implemented on controllers C1-C3 may be in communication with each other, thus effectively making up the module 40. In one embodiment, the logic 46, 48, and 50 may be implemented using JavaScript code or another other suitable programming or scripting language.

Figure 6:
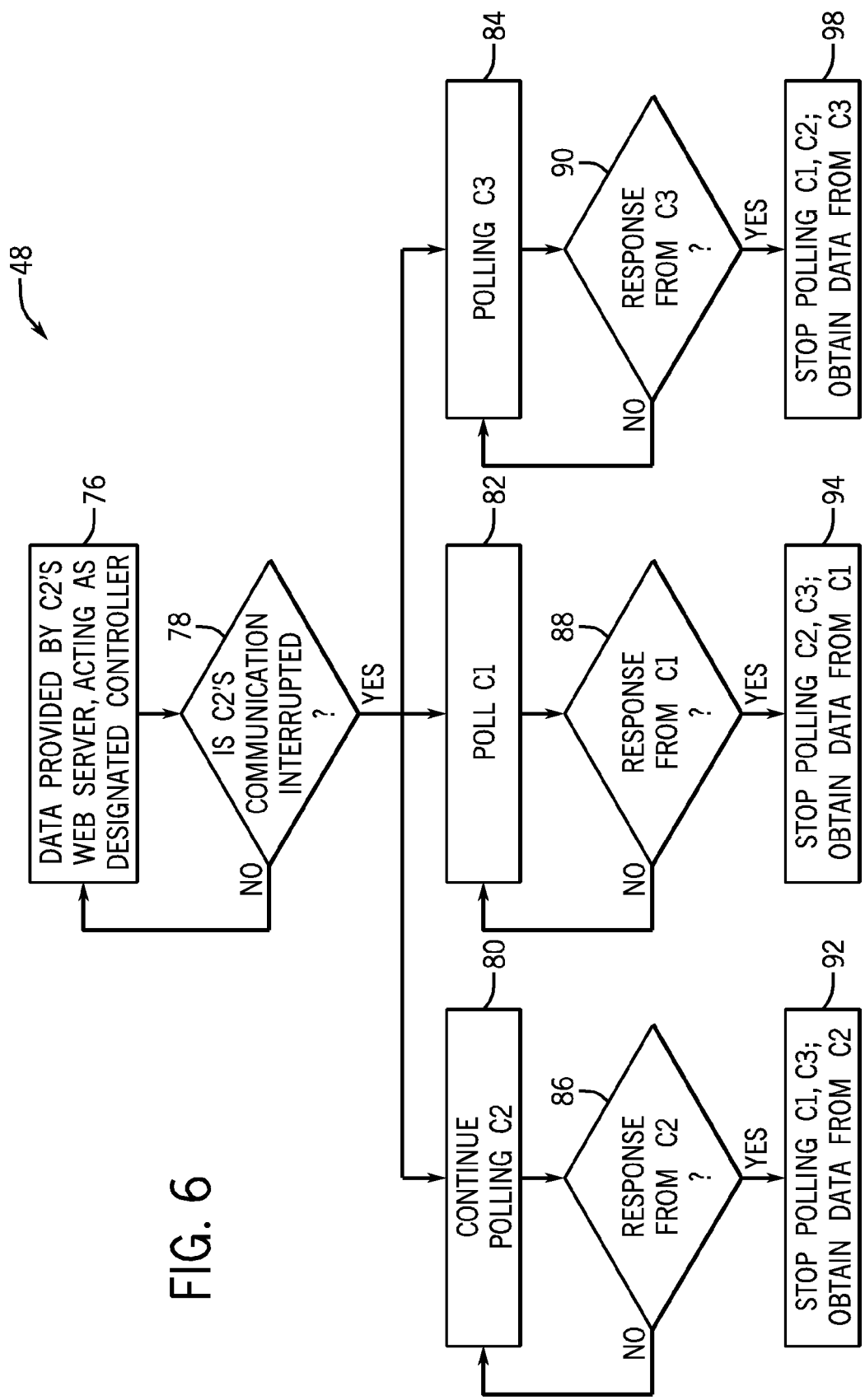
FIG. 6 is a flow chart depicting a process that may be implemented on the second controller of FIG. 4 by the automatic detection and communication module, in accordance with an embodiment of the present invention.

Referring to FIG. 6, the logic 48, which represents the portion of the module 40 implemented in controller C2, begins at step 76. At step 76, controller C2 (36b) is initially the designated controller and provides data to the HMI client 32. Decision logic 78 determines whether controller C2's communication path (e.g., path to the HMI client 32 and/or to the turbine system 12) is interrupted. If no interruption is detected, the logic 48 returns to step 76, and controller C2 remains as the designated controller.

If an interruption is detected, the logic 48 continues from decision logic 78 to each of steps 80, 82, and 84 in which the controllers C2, C1, and C3, respectively, are polled, and their subsequent steps (e.g., steps 86, 88, 90) may occur in parallel. For instance, the polling steps may include pinging each of the controllers C2, C1, and C3 and awaiting a response. From step 80, a determination is made at decision logic 86 as to whether a response is received from controller C2. If no response is obtained from controller C2, logic 48 returns from decision logic 86 to step 80 and continues polling C2. Concurrently, from step 82, a determination is made at decision logic 88 as to whether a response is received from controller C1. If no response is obtained from controller C1, logic 48 returns from decision logic 88 to step 82 and continues polling C1. Also concurrently, from step 84, a determination is made at decision logic 90 as to whether a response is received from controller C3. If no response is obtained from controller C3, logic 48 returns from decision logic 90 to step 84 and continues polling C3. Depending on which of the controllers C1-C3 responds first to the polling from steps 80-84, one of steps 92, 94, 98 is performed. For instance, if controller C2 responds first, decision logic 86 proceeds to step 92 at which the logic 48 stops polling controllers C1 and C3 and sets controller C2 as the designated controller again. In this case, the new designated controller is the same as the previous designated controller, and the web-based HMI 32 continues communicating with and obtaining data from controller C2.

If controller C1 responds first, decision logic 88 proceeds to step 94 at which the logic 48 stops polling controllers C2 and C3 and sets controller C1 as the designated controller. In this case, the web-based HMI 32 switches its communication path to communicate with and obtain data from controller C1. If controller C3 responds first, then decision logic 90 proceeds to step 98 at which the logic 48 stops polling controllers C2 and C1 and sets controller C3 as the designated controller. In this case, the web-based HMI 32 switches its communication path to communicate with and obtain data from controller C3.

Figure 7:
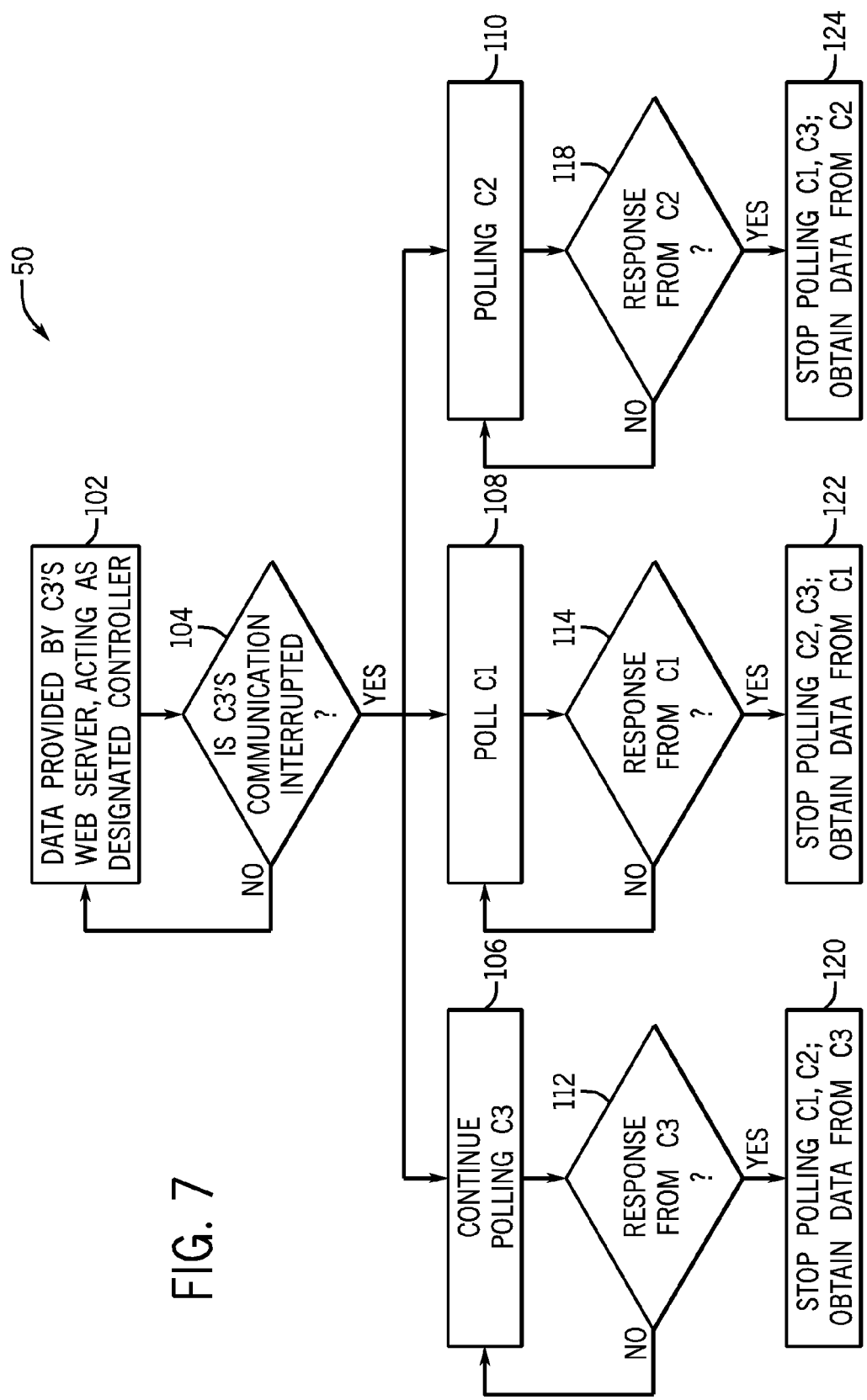
FIG. 7 is a flow chart depicting a process that may be implemented on the third controller of FIG. 4 by the automatic detection and communication module, in accordance with an embodiment of the present invention.

Next, referring to FIG. 7, the logic 50, which represents the portion of the module 40 implemented in controller C3, begins at step 102. At step 102, controller C3 (36c) is initially the designated controller and provides data to the HMI client 32. Decision logic 104 determines whether controller C3's communication path (e.g., path to the HMI client 32 and/or to the turbine system 12) is interrupted. If no interruption is detected, the logic 50 returns to step 102, and controller C3 remains as the designated controller.

If an interruption is detected, the logic 50 continues from decision logic 104 to each of steps 106, 108, 110 in which the controllers C3, C1, and C2, respectively, are polled, and their subsequent steps (e.g., steps 112, 114, and 118) may occur in parallel. For instance, the polling steps may include pinging each of the controllers C3, C1, and C2 and awaiting a response. From step 106, a determination is made at decision logic 112 as to whether a response is received from controller C3. If no response is obtained from controller C3, logic 50 returns from decision logic 112 to step 106 and continues polling C3. Concurrently, from step 108, a determination is made at decision logic 114 as to whether a response is received from controller C1. If no response is obtained from controller C1, logic 50 returns from decision logic 114 to step 108 and continues polling C1. Also concurrently, from step 110, a determination is made at decision logic 118 as to whether a response is received from controller C2. If no response is obtained from controller C2, logic 50 returns from decision logic 118 to step 110 and continues polling C2. Depending on which of the controllers C1-C3 responds first to the polling from steps 106, 108, and 110, one of steps 120, 122, and 124 is performed. For instance, if controller C3 responds first, decision logic 112 proceeds to step 120 at which the logic 50 stops polling controllers C1 and C2 and sets controller C3 as the designated controller again. In this case, the new designated controller is the same as the previous designated controller, and the web-based HMI 32 continues communicating with and obtaining data from controller C3.

If controller C1 responds first, decision logic 114 proceeds to step 122 at which the logic 50 stops polling controllers C2 and C3 and sets controller C1 as the designated controller. In this case, the web-based HMI 32 switches its communication path to communicate with and obtain data from controller C1. If controller C2 responds first, then decision logic 118 proceeds to step 124 at which the logic 50 stops polling controllers C1 and C3 and sets controller C2 as the designated controller. In this case, the web-based HMI 32 switches its communication path to communicate with and obtain data from controller C2. As can be appreciated from the description provided above with respect to FIGS. 5-7, the portion of logic 46, 48, or 50 executed by the module 40 may depend on which controller is providing data (e.g., the designated controller) when communication is interrupted. For instance, if controller C2 was the designated controller when an interruption occurred, then the process depicted by logic 48 in FIG. 6 is carried out to determine the next designated controller.

Figure 8:
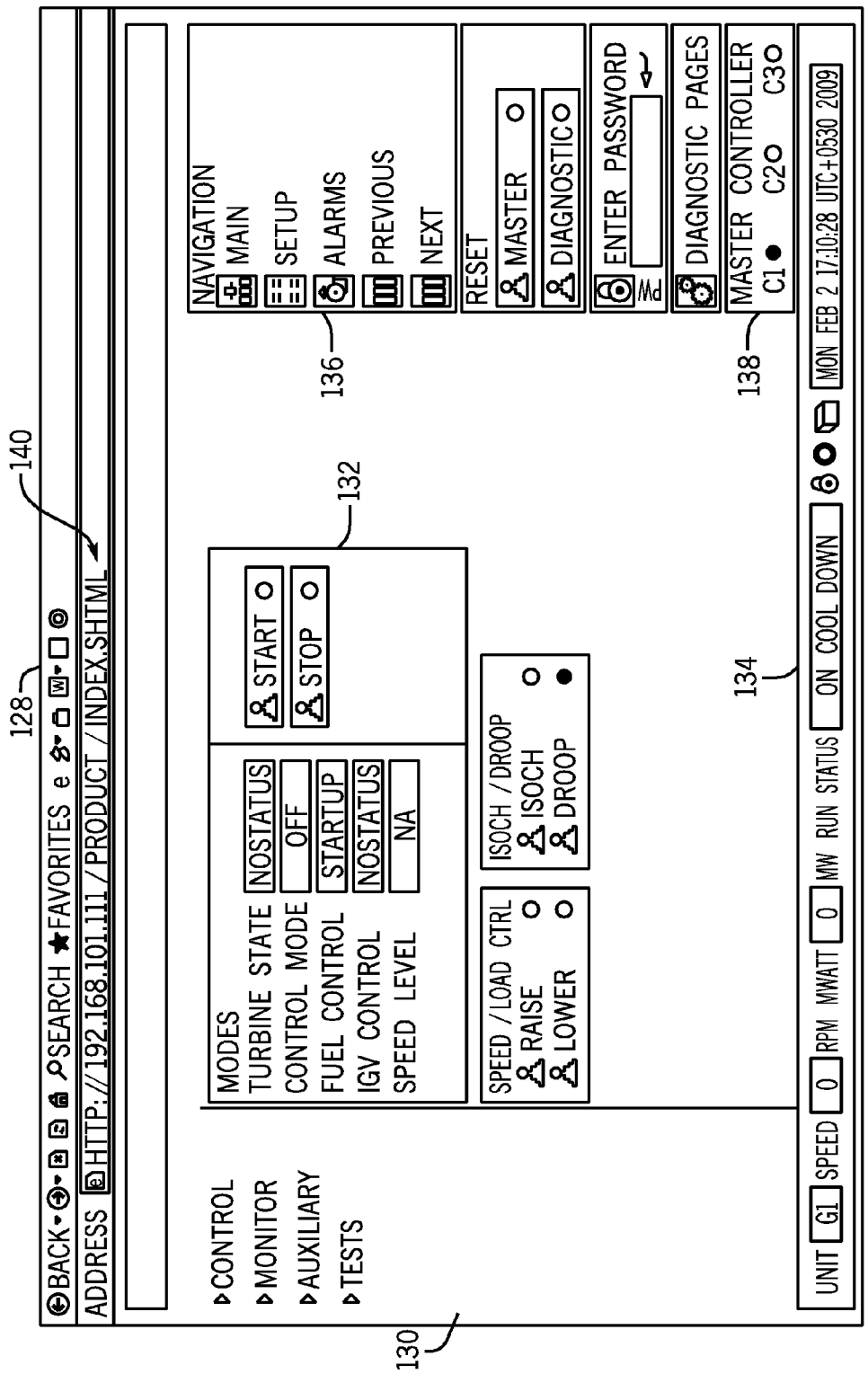
FIGS. 8-9 show a screen image that may be displayed as part of a graphical user interface of an HMI client that includes graphical elements indicating a designated controller.
Figure 9:
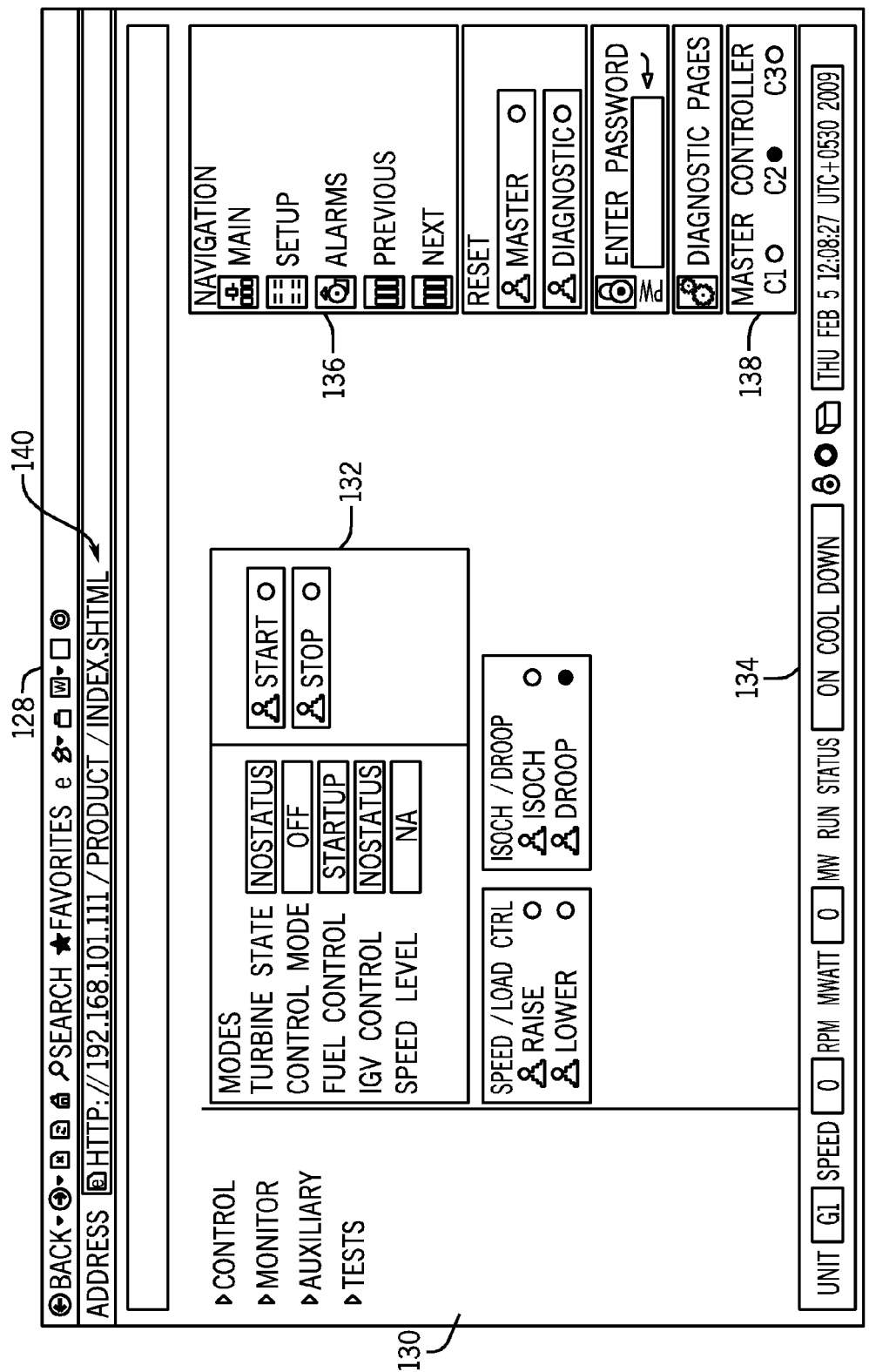

Referring to FIGS. 8-9, screenshots depicting an embodiment of above-described web-based HMI 32 is illustrated. As discussed above and shown in FIG. 8, the web-based HMI 32 may be implemented as a web page 130 in a web browser 128. By way of example, the web browser 128 may be implemented using Internet Explorer, Mozilla Firefox, Apple Safari, or any other suitable web browser software. The web page 130 may include various elements, such as a window 132, status bar 134, navigation options 136, and a designated controller indicator 138. In the illustrated embodiment, the window 132 may be configured to display modes of operation for certain components or sub-controllers of the turbine system 12. The status bar 134 may be configured to display values for certain parameters, such as speed (in RPM) and power output (in megawatts). The navigation options 136 may allow for an operator to navigate to different windows (e.g., represented by different webpages or different frames within a webpage) to access data pertaining to different aspects of the system 10.

The indicator 138 may inform the operator (e.g., the user of the HMI) as to which of the controllers C1-C3 is currently the designated controller. For example, in FIG. 8, the indicator 138 shows that controller C1 is the current designated controller. The address bar of the web browser 128 may also indicate an IP address 140 that corresponds to controller C1. In the event that the communication to controller C1 is interrupted, FIG. 9 shows an example of how the web page 130 may be updated if controller C2 is selected as the new designated controller. For instance, as shown in FIG. 9, the indicator 138 now indicates that the designated controller has changed from C1 to C2. Additionally, the address bar of the web browser 128 also shows an updated IP address 140 that corresponds to controller C2.

As will be understood, the various techniques described above and relating to the automatic selection of a designated controller from a set of redundant controllers in a distributed control system are provided herein by way of example only. Accordingly, it should be understood that the present disclosure should not be construed as being limited to only the examples provided above. Further, it should be appreciated that the above-discussed techniques may be implemented in any suitable manner, including hardware (e.g., suitably configured circuitry), software (e.g., via a computer program including executable code stored on one or more tangible computer readable medium), or via using a combination of both hardware and software elements. Thus, the term "code," as used herein, may refer to machine-readable code (e.g., readable by a computer and/or processor) that may be stored in a machine-readable storage medium (e.g., disk, hard drive, optical drive, flash memory, etc.) for execution by a processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A control system comprising:
a plurality of controllers, each of the plurality of controllers comprising a processor, wherein the processor of each of the plurality of controllers is configured to:
provide process data facilitated from an input/output module to a human-machine interface (HMI) client when selected as a designated controller, wherein a first controller of the plurality of controllers is a current designated controller configured to communicate with the HMI client, and
implement a control algorithm that affects a result in the control system; and
a designated controller selection logic module comprising a processor configured to execute designated controller selection logic, the designated controller selection logic configured to detect an interruption in communication between the current designated controller and the HMI client, poll each of the plurality of controllers for a response, determine which of the plurality of controllers responds first, and select the controller that responds first as the next designated controller.

2. The control system of claim 1, wherein the designated controller selection logic is configured to provide an identity of the next designated controller to the HMI client, and wherein the HMI client automatically communicates with the next designated controller upon receiving its identity.

3. The control system of claim 2, wherein providing the identity of the next designated controller to the HMI client comprises providing an internet protocol address corresponding to a communication port of the next designated controller to the HMI client directly from the designated controller selection logic module.

4. The control system of claim 1, wherein the HMI client comprises a web-based HMI client.

5. The control system of claim 1, wherein each controller comprises an embedded web server application.

6. The control system of claim 1, wherein the process data is communicated from the designated controller to the HMI client as dynamic web pages.

7. The control system of claim 1, wherein the current designated controller and the next designated controller comprise the same controller.

8. The control system of claim 1, wherein the designated controller selection logic is distributed across all of the plurality of controllers.

9. The control system of claim 1, wherein the designated controller selection logic comprises particular controller designated controller selection logic stored on a particular controller that is configured to:
 determine if the particular controller is the designated controller;
 detect an interruption in communication between the particular controller and the HMI client only if the particular controller is the designated controller;
 poll each of the plurality of controllers for a response only when detecting an interruption in communication between the particular controller and the HMI client; and
 receiving a first poll response from one of the plurality of controllers after polling each of the plurality of controllers; and
 selecting the controller that provided the first poll response as the next designated controller.

10. A system comprising:
 a process;
 a client device comprising a web-based human-machine interface (HMI); and
 a distributed control system in networked communication with the client device and the process, wherein the distributed control system is configured to control the process and comprises:
  a plurality of controllers, each comprising a processor, each of the plurality of controllers being configured to:
   receive data from the process from an input/output module,
   provide the data from the process to the web-based HMI of the client device when acting as a designated controller, and
   implement a control algorithm that affects the process when acting as the designated controller; and
  a designated controller selection logic hardware module, comprising a processor configured to execute designated controller selection logic, the designated controller selection logic configured to detect an interruption in communication between a previous designated controller and the web-based client, poll each of the plurality of controllers for a response, and select a current designated controller as the controller that responds first to the polling;
 wherein the client device is configured to automatically establish communication with the current designated controller to obtain data from the process.

11. The system of claim 10, wherein the plurality of controllers comprises a first controller, a second controller, and a third controller, and wherein the designated controller selection logic is distributed across the first controller, the second controller, and the third controller.

12. The system of claim 11, wherein a first portion of the designated controller selection logic is stored in a memory of the first controller, and wherein the first portion of the designated controller selection logic is configured to:
 when the first controller is the previous designated controller, determine if communication between the client device and the first controller is interrupted;
 if the communication between the client device and the first controller is interrupted, poll the first, second and third controllers for a response;
 determine which of the first, second, and third controllers responds first to the polling; and
 select the first responding controller as the current designated controller and stop the polling of the remaining controllers.

13. The system of claim 12, wherein a second portion of the designated controller selection logic is stored in a memory of the second controller, and wherein the second portion of the designated controller selection logic is configured to:
 when the second controller is the previous designated controller, determine if communication between the client device and the second controller is interrupted;
 if the communication between the client device and the second controller is interrupted, poll the first, second and third controllers for a response;
 determine which of the first, second, and third controllers responds first to the polling; and
 select the first responding controller as the current designated controller and stop the polling of the remaining controllers.

14. The system of claim 13, wherein a third portion of the designated controller selection logic is stored in a memory of the third controller, and wherein the third portion of the designated controller selection logic is configured to:
 when the third controller is the previous designated controller, determine if communication between the client device and the third controller is interrupted;
 if the communication between the client device and the third controller is interrupted, poll the first, second and third controllers for a response;
 determine which of the first, second, and third controllers responds first to the polling; and
 select the first responding controller as the current designated controller and stop the polling of the remaining controllers.

15. The system of claim 10, wherein the web-based HMI communicates to a web server of the current designated controller and obtains data from the process in as a dynamically generated web page.

16. The system of claim 15, wherein the web-based HMI is configured to obtain the data from the process using an Asynchronous JavaScript and XML (AJAX) web application.

17. The system of claim 15, wherein the web server comprises an embedded web server based at least partially upon a real-time operating system.

18. The system of claim 15, wherein the client device comprises a computer workstation, a notebook computer, a personal digital assistant (PDA), a mobile telephone, a tablet computer, or some combination thereof.

19. The system of claim 15, wherein the process comprises a gas turbine system.

20. A tangible, non-transitory, computer-readable medium having instructions encoded thereon, wherein the instructions comprise:
- machine-readable code for determining whether communication between a designated controller and a web-based client is interrupted, wherein the designated controller was previously selected as the designated controller from plurality of controllers of a redundant-controller control system and the designated controller is configured to:
  - provide process data from an input/output module to a human-machine interface (HMI) client, and
  - implement a control algorithm that affects a result in the redundant-controller control system;
- machine-readable code to poll each of the plurality of controllers for a response upon determining communication between the designated controller and the web-based client is interrupted;
- machine-readable code to identify which of the plurality of controllers responds first to the polling;
- machine-readable code to select the controller that responded first as a new designated controller.

* * * * *